United States Patent Office 3,312,707
Patented Apr. 4, 1967

3,312,707
SPARINGLY SOLUBLE SALTS OF THE 6,6-UREYLENE - BIS - (1 - METHYLQUINO-LINIUM) CATION
William Glynne Moss Jones, Macclesfield, England, assignor to Imperial Chemical Industries Limited, London, England, a corporation of Great Britain
No Drawing. Filed Dec. 5, 1963, Ser. No. 328,171
Claims priority, application Great Britain, Dec. 20, 1962, 48,244/62
4 Claims. (Cl. 260—286)

This invention relates to heterocyclic compounds and more particularly it relates to quinoline derivatives which are salts or complexes, sparingly soluble in water, and which are useful for prophylactic treatment against babesiasis in cattle.

According to the invention I provide quinoline derivatives which are salts or complexes formed by interaction of a 6,6-ureylene-bis-(1-methylquinolinium) cation of the formula:

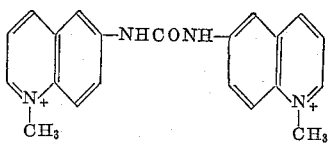

and a 5,5'-methylene-bis salicylate (I), a 1,1'-methylene-bis-(2-hydroxy-3-naphthoate) (II) or a sym.-bis-(m-aminobenzoyl - m - amino - p - methyl - benzoyl - 1 - napthylamino-4,6,8-trisulphonate)carbamide (III) anion of the formula:

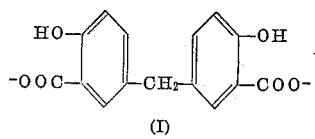
(I)

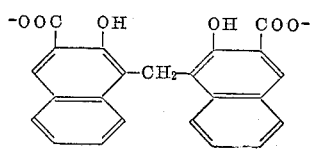
(II)

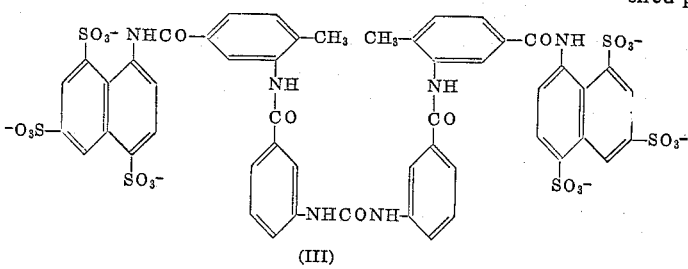
(III)

According to a further feature of the invention I provide a process for the manufacture of the said salts or complexes which comprises interaction of the said cation and the said anion in an aqueous medium.

The salts or complexes with which the invention is concerned are sparingly-soluble in water and they are thus precipitated from the reaction medium. As a suitable salt containing the said cation there may be mentioned for example the methosulphate and as a suitable salt containing the said anion there may be mentioned for example an alkaline metal salt for example a sodium or potassium salt, or an ammonium salt. The reaction may be carried out in water as the aqueous medium.

According to a further feature of the invention I provide pharmaceutical compositions suitable for the prophylactic treatment of babesiasis in cattle which comprise as active ingredient one of the said salts or complexes of this invention in admixture with a diluent or carrier therefor.

The said compositions are preferably those suitable for parenteral administration for example sterile aqueous or oily suspensions or dispersible powders from which aqueous suspensions can be prepared. The said suspensions may conveniently contain wetting agents, dispersing agents or suspending agents.

The invention is illustrated but not limited by the following examples in which the parts are by weight:

Example 1

A solution of 28.8 parts of 6,6'-ureylene-bis-(1-methylquinolinium methosulphate) in 100 parts of water is added to a solution of 14.4 parts of 5,5'-methylene-bis salicylic acid in 200 parts of 2% aqueous sodium hydroxide solution. The reaction mixture is filtered, the solid residue is washed with water and is then dried at 18–22° C. There is thus obtained 6,6'-ureylene-bis-(1-methylquinolinium)-(5,5'-methylene-bis salicylate) as a yellow crystalline solid melting with decomposition at 220° C.

Example 2

9.7 parts of 1,1'-methylene-bis-(2-hydroxy-3-naphthoic acid) [also known as embonic acid and pamoic acid] are dissolved in 50 parts of 4% aqueous sodium hydroxide solution. To this solution is added a solution of 14 parts of 6,6' - ureylene - bis - (1 - methylquinolinium methosulphate) in 100 parts of water. The reaction mixture is filtered and the solid residue is washed with water and dried at 18–22° C. There is thus obtained 6,6'-ureylene-bis-(1-methylquinolinium) - (1,1' - methylene - bis - 2 - hydroxy-3-naphthoate) as a yellow crystalline solid, melting with decomposition at 226° C.

The 50 parts of 4% aqueous sodium hydroxide used in the above process is replaced by 50 parts of 5.6% aqueous potassium hydroxide or by 50 parts of 1.7% aqueous ammonia and there is likewise obtained the desired product, melting with decomposition at 226° C.

Example 3

A solution of 10 parts of 6,6'-ureylene-bis-(1-methylquinolinium methosulphate) in 190 parts of water is added to a solution of 13.7 parts of hexasodium sym.-bis-(m-aminobenzoyl - m - amino - p - methylbenzoyl-1-naphthylamino - 4,6,8-tri-sulphonate) carbamide (also known as suramin sodium) in 100 parts of water. The reaction mixture is filtered and the solid residue is washed with water and dried at 18–22° C. There is thus obtained 6,6' - ureylene-bis-(1-methylquinolinium)-suraminate as a yellow powder melting with decomposition at 300° C.

Example 4

5 parts of 6,6'-ureylene-bis-(1-methylquinolinium)-(5,5'-methylene-bis salicylate) and 48 parts of a 0.1% aqueous solution of polyoxyethylene sorbitan mono-oleate are milled for 1 hour. There is thus obtained an aqueous suspension of 6,6'-ureylene-bis-(1-methylquinolinium)-(5,5'-methylene-bis salicylate) which is suitable for parenteral use for the prophylactic treatment of babesiasis in domestic animals.

Example 5

2.5 parts of 6,6'-ureylene-bis-(1-methylquinolinium)-suraminate and 24 parts of a 0.1% aqueous solution of polyoxyethylene sorbitan mono-oleate are ball-milled for 30 minutes. There is thus obtained an aqueous suspension which is suitable for parenteral use for the prophylactic treatment of babesiasis in domestic animals.

Example 6

5 parts of 6,6'-ureylene-bis-(1-methylquinolinium)-(1,1' - methylene-bis-2-hydroxy-3-naphthoate) and 47.5 parts of a 0.1% aqueous solution of polyoxyethylene sorbitan mono-oleate are ball-milled for 30 minutes. There is thus obtained an aqueous suspension of 6,6'-ureylene-bis-(1-methylquinolinium) - (1,1'-methylene-bis-2-hydroxy-3-naphthoate) which is suitable for parenteral use for the prophylactic treatment of babesiasis in domestic animals.

Example 7

20 parts of 6,6'-ureylene-bis-(1-methylquinolinium)-(5,5'-methylene-bis salicylate) and 80 parts of arachis oil are ball-milled for 3 hours. There is thus obtained an oily suspension of 6,6'-ureylene-bis-(1-methylquinolinium)-(5,5'-methylene-bis salicylate) which is suitable for parenteral use for the prophylactic treatment of babesiasis in domestic animals.

Example 8

100 parts of 6,6'-ureylene-bis-(1-methylquinolinium)-(1,1' - methylene - bis - 2 - hydroxy-3-naphthoate) are triturated with 70 parts of a solution prepared by dissolving 25 parts of soya-bean lecithin and 5 parts of a condensation product (obtained from octyl cresol and 8–10 molecular proportions of ethylene oxide) in 700 parts of diethyl ether. The paste is stirred until all the ether has evaporated and the resultant solid is then ground in a suitable mill. There is thus obtained a dispersible powder and on addition of water, there is obtained an aqueous suspension of 6,6'-ureylene-bis-(1-methylquinolinium)-(1,1' - methylene-bis-2-hydroxy-3-naphthoate) which is suitable for parenteral injection for the prophylactic treatment of babesiasis in domestic animals.

Example 9

97 parts of embonic acid are dissolved in 1.5 litres of water containing sufficient sodium hydroxide to give a solution of sodium embonate of pH 10.0 which is then filtered; with vigorous agitation, the filtrate is adjusted to pH 7.0. 142 parts of 6,6'-ureylene-bis-(1-methylquinolinium methosulphate) are dissolved in 1.5 litres of water and the solution is filtered. To this filtrate is added the solution of sodium embonate with vigorous agitation and the suspension obtained has a pH of 5.0. The suspension is filtered and the solid residue is washed twice by resuspending each time in 2 litres of distilled water and filtering after adjusting the pH of the suspension to 3.5–4.0. The solid residue is finally suspended in water to provide a 20% w./v. suspension which is then autoclaved at 115° C. for 30 minutes. The suspension so obtained is suitable for parenteral use for the prophylactic treatment of babesiasis in domestic animals.

What I claim is:

1. A salt of the 6,6-ureylene-bis-(1-methylquinolinium) cation of the formula

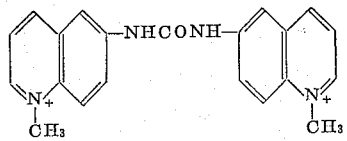

with an anion selected from the group consisting of the 5,5'-methylene-bis-salicylate anion of the formula

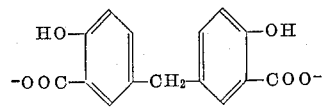

the 1,1'-methylene-bis-(2-hydroxy-3-naphthoate) anion of the formula

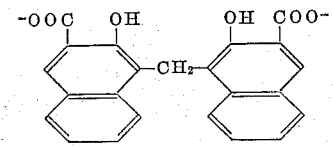

and the sym.-bis - (m-aminobenzoyl-m-amino-p-methylbenzoyl - 1 - naphthylamino-4,6,8-trisulphonate) carbamide anion of the formula

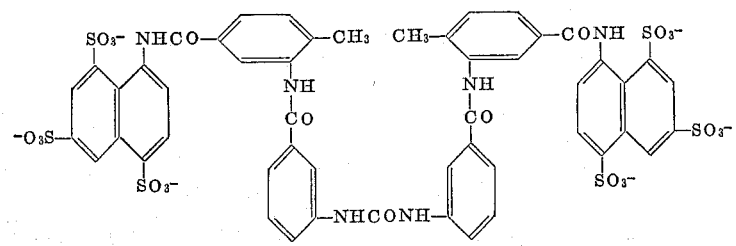

2. 6,6 - ureylene-bis-(1-methylquinolinium)-5,5'-methylene-bis-salicylate.
3. 6,6 - ureylene-bis-(1-methylquinolinium)-embonate.
4. 6,6 - ureylene - bis - (1-methylquinolinium)-suraminate.

References Cited by the Examiner

UNITED STATES PATENTS

| | | | |
|---|---|---|---|
| 2,108,484 | 2/1938 | Hamer et al. | 260—286 X |
| 2,662,083 | 12/1953 | Eastland et al. | 260—286 |
| 2,760,964 | 8/1956 | Carrington et al. | 260—286 |
| 2,827,466 | 3/1958 | Slack et al. | 260—313 |
| 2,901,484 | 8/1959 | Schock | 260—286 |
| 2,925,417 | 2/1960 | Eislager et al. | 260—240 |
| 3,022,218 | 2/1962 | Sherman et al. | 167—53 |
| 3,152,042 | 10/1964 | Wood et al. | 167—53 |
| 3,200,143 | 8/1965 | Copp | 260—501 |

FOREIGN PATENTS

| | | |
|---|---|---|
| 703,484 | 2/1954 | Great Britain. |
| 839,505 | 6/1960 | Great Britain. |

ALEX MAZEL, *Primary Examiner.*

DONALD G. DAUS, *Assistant Examiner.*